No. 659,156. Patented Oct. 2, 1900.
E. NORTON.
CAN SOLDERING MACHINE.
(Application filed June 14, 1899.)
(No Model.) 2 Sheets—Sheet 1.
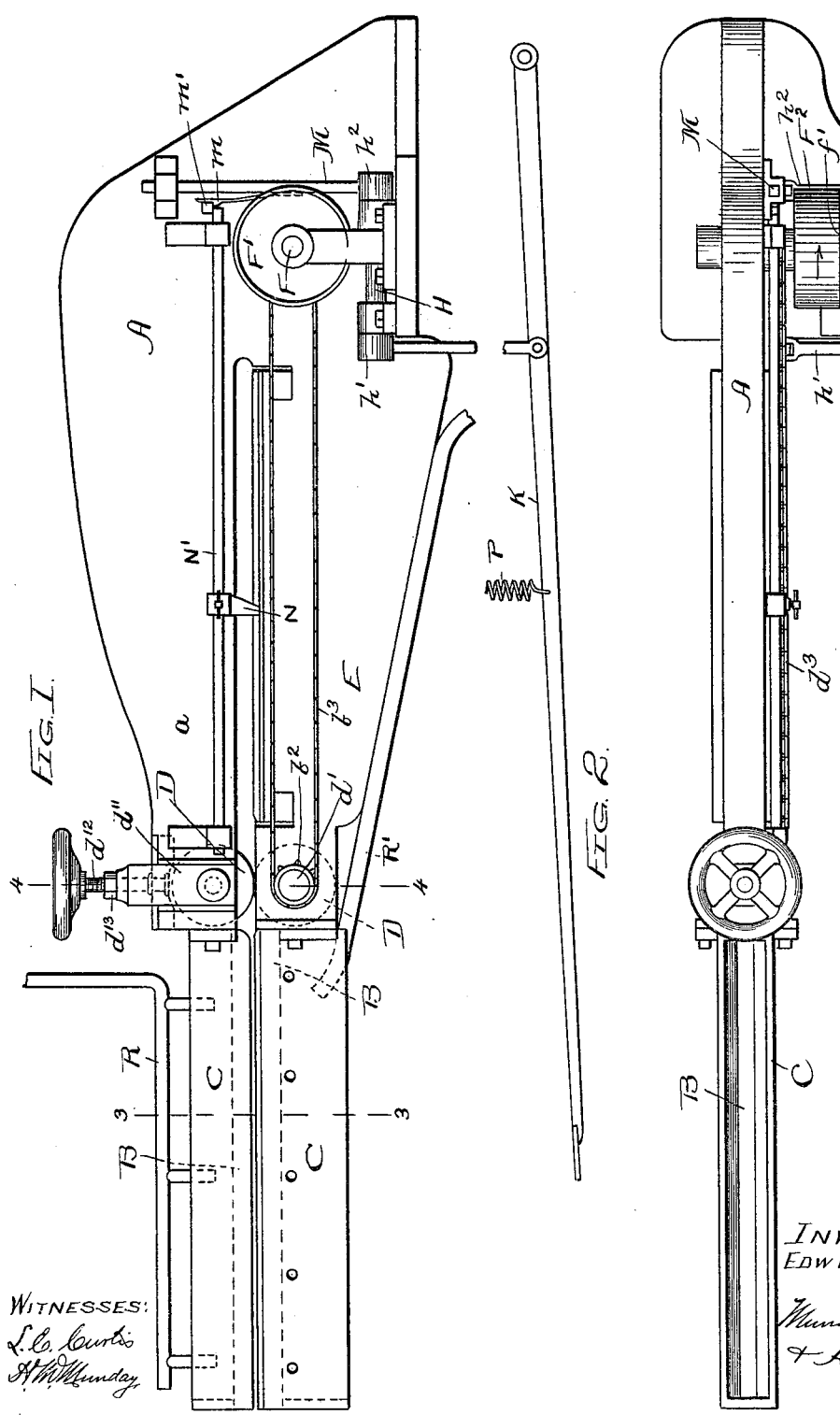
INVENTOR:
EDWIN NORTON
BY
Munday, Evarts
& Adcock
HIS ATTORNEYS.
WITNESSES:
L. E. Curtis
H. W. Munday No. 659,156. Patented Oct. 2, 1900.
E. NORTON.
CAN SOLDERING MACHINE.
(Application filed June 14, 1899.)
(No Model.) 2 Sheets—Sheet 2.
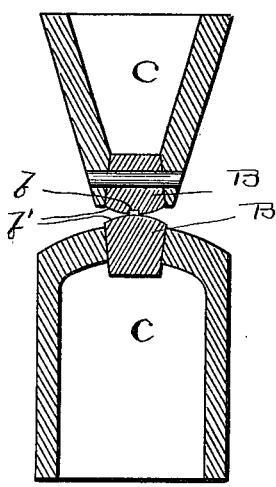
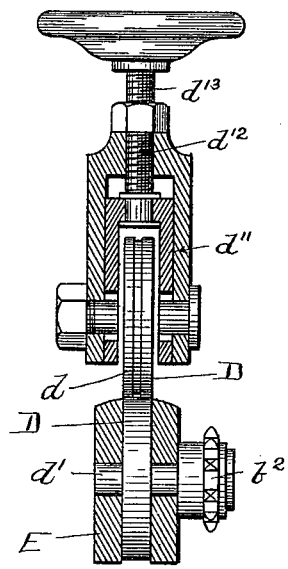
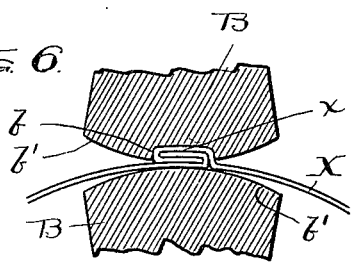
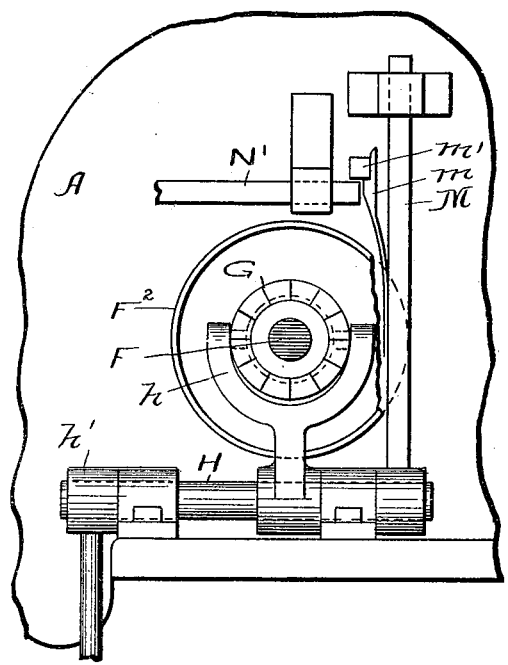
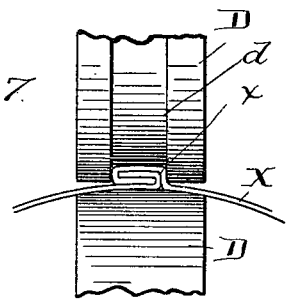
INVENTOR:
EDWIN NORTON
BY Munday, Evarts & Adcock.
HIS ATTORNEYS.
WITNESSES:

UNITED STATES PATENT OFFICE.

EDWIN NORTON, OF MAYWOOD, ILLINOIS, ASSIGNOR TO THE NORTON BROTHERS, OF ILLINOIS.

CAN-SOLDERING MACHINE.

SPECIFICATION forming part of Letters Patent No. 659,156, dated October 2, 1900.

Application filed June 14, 1899. Serial No. 720,451. (No model.)

*To all whom it may concern:*

Be it known that I, EDWIN NORTON, a citizen of the United States, residing in Maywood, in the county of Cook and State of Illinois, have invented a new and useful Improvement in Can-Soldering Machines, of which the following is a specification.

My invention relates to improvements in soldering-machines.

The object of my invention is to provide a machine of a simple and efficient construction by means of which the joints or seams of can-bodies or other vessels or articles made of tin-plate may be firmly and hermetically formed or soldered without the application thereto or use of additional solder by simply fusing the tin or other soft-metal coating of the plate and compressing together and uniting the folds or parts of the seam or joint through the agency of the tin or soft-metal coating itself.

My invention consists in the means I employ to accomplish this important object or result—that is to say, it consists in the combination, with a pair of heaters, preferably copper bars or shoes, adapted to embrace the seam or joint to be soldered and heat the same to the fusing-point of the tin or other soft-metal coating of the plate, of a pair of seam-compressing rollers mounted at one end of the heaters, between which the seam or joint passes direct from the heaters, by which the fused tin or soft-metal coating of the folds or parts of a seam is caused to firmly and hermetically solder or unite the folds or parts of a seam securely together. The heaters or coppers are provided with heating-chambers partially surrounding the same to maintain the heaters at the proper temperature for fusing the soft-metal coating of the tin-plate or other sheet metal to be soldered, and one of the seam-compressing rollers is furnished with mechanism for rotating the same first in one direction to feed or pass the seam or joint between the rollers and then in the opposite direction to discharge the soldered can-body or vessel from the machine, one of the heaters and one of the compressing-rollers being so mounted and supported that the can-body or vessel being soldered may be passed over the same like a horn.

My invention further consists in the novel construction of parts and devices and in the novel combinations of parts and devices herein shown and described, and specified in the claims.

In the accompanying drawings, forming a part of this specification, and in which similar letters of reference indicate like parts throughout all the views, Figure 1 is a side elevation of a machine or apparatus embodying my invention. Fig. 2 is a plan view. Figs. 3 and 4 are vertical sections on lines 3 3 and 4 4 of Fig. 1. Fig. 5 is a detail rear view. Fig. 6 is an enlarged detail vertical cross-section through the heaters or coppers, showing the seam to be heated in position between them; and Fig. 7 is a detail front view of the compressing-rollers, showing the seam or joint being compressed between them.

In the drawings, A represents the frame of the machine.

B B are the heaters or devices by which the seam $x$ of the can-body or vessel X, of tin-plate or other sheet metal having a coating of tin or other soft easily-fusible metal, is embraced and heated.

The heaters B are preferably shoes or bars of copper and are each preferably provided with a heating-chamber C, partially surrounding the same. The upper heater or copper B is provided with a longitudinal groove $b$ to receive the folded seam or joint $x$. The heaters or coppers B are each preferably provided with a curved face $b'$, so that the can-body or vessel X will have direct contact with the heaters only at its seam $x$ in order that the tin or other coating may be fused only at and in the seam.

D D are the compressing-rollers, the upper compressing-roller having a groove $d$ to receive and guide the seam corresponding to the groove $b$ in the upper shoe or heater B. The rollers D are mounted at the inner end of the heaters B, so that as the heated seam passes from the heaters it is immediately compressed between the rollers and the fused coating of tin or other soft metal caused to securely and hermetically unite the parts of the seam, the rollers serving to simultaneously compress together the folds or parts of the seam and to chill the tin or fusible coating of the tin-plate or sheet metal, thus forming a perfect soldered joint or seam through the agency of the tin or other soft-metal coating itself. The lower roller D is journaled on the outer end of a horn E, secured to or forming part of the frame A, so that the can-body or vessel X as it passes between the rollers may pass over or around the roller and the horn E, upon which it is mounted. The lower heater B and its heating-chamber C are attached to the outer end of this horn E and form a continuation or extension thereof, so that the can-body or vessel X may pass over and surround the same, as required. The lower heating-roller D is preferably the driven one, and its shaft $d'$ is provided with a sprocket-wheel or pulley $b^2$, by which it is driven from a chain $b^3$ from the driving-shaft F, which is provided with a sprocket-wheel to receive said chain. The driving-shaft F is provided with two driving-pulleys $F'$ $F^2$, one driven in one direction and the other in the opposite direction by belts from any suitable source of power, and the driving-shaft F is clutched first to one of these driving-pulleys and then to the other by means of a sliding clutch G, adapted to engage the clutch-faces $f'$ of said driving-pulleys $F'$ $F^2$, the one or the other at a time.

The clutch G is operated by a lever or rock-shaft H, having an arm $h$, engaging the clutch, an arm $h'$, connected with the operating treadle or lever K, and an arm $h^2$, connected to a sliding bar M, carrying a spring dog or pawl $m$, that engages a stop or projection $m'$. The clutch G is normally held in engagement with the driving-pulley $F'$ by a spring P, the driving-pulley $F'$ being the one that drives the compressing-roller D in the direction to discharge the can from the machine.

After the seam to be soldered or united has been sufficiently heated by the heaters B B the operator by putting his foot on the treadle K shifts the clutch G from engagement with the driving-pulley $F'$ into engagement with the driving-pulley $F^2$ and at the same time pushes the can-body forward until its heated seam enters between the compressing-rollers D D, which are now being driven in the direction to feed or pass the can-body over the horn E and between the compressing-rollers. At this time the spring pawl or dog $m$ by engagement with the stop or projection $m'$ holds the clutch G into engagement with the driving-pulley $F^2$. As soon as the whole length of the seam has been passed between the compressing-rollers the can-body strikes a trip or projection N on a sliding bar N', which engages the spring pawl or dog $m$, thus pushing said pawl or dog out of engagement with its stop or projection $m'$, thereby permitting the spring P to instantly shift the clutch G from engagement with the driving-pulley $F^2$ into engagement again with the driving-pulley $F'$, and thereby reversing the compressing-roller D and causing the can to be passed back between the rollers and discharged from the machine, the operator slipping it from between the heaters B B as soon as it leaves the rollers D D. The heating-chamber C is preferably heated by gas supplied thereto through the gas-pipes R R'. The upper roller D is mounted in an adjustable journal or bearing $d^{11}$, the same being adjusted up or down as required to produce the requisite pressure upon the seam passing between the rollers by means of an adjusting-screw $d^{12}$ and nuts $d^{13}$.

I claim—

1. In a machine for uniting together the parts of a seam or joint of tin-plate or other sheet metal having a soft fusible metal coating, the combination with a pair of heaters between which the parts of the seam to be united may be embraced and the tin or other soft-metal coating thereof heated to the fusing-point, of a pair of compressing-rollers at one end of the heaters between which the seam may be passed direct from the heaters, and by which the parts or folds of the seam are compressed and the fusible coating set, whereby the parts of the seam are securely and hermetically united together through the agency of the tin or other soft-metal coating of the tin-plate or sheet metal itself, substantially as specified.

2. The combination with a pair of heaters adapted to embrace and heat the parts of the seam between them, of a pair of compressing-rollers between which the seam passes from the heaters, substantially as specified.

3. The combination with a pair of heaters adapted to embrace and heat the parts of the seam between them, of a pair of compressing-rollers between which the seam passes from the heaters, and mechanism for driving the compressing-rollers first in one direction and then the other, substantially as specified.

4. The combination with a pair of heaters adapted to embrace and heat the parts of the seam between them, of a pair of compressing-rollers between which the seam passes from the heaters, mechanism for driving the compressing-rollers first in one direction and then the other, and a movable trip adapted to be engaged by the can-body or vessel after passing between the compressing-rollers for automatically reversing the compressing-rollers, substantially as specified.

5. The combination with a pair of heaters adapted to embrace and heat the parts of the same between them, of a pair of compressing-rollers between which the seam passes from the heaters, and a horn upon which one of the compressing-rollers and one of the heaters is mounted, substantially as specified.

6. The combination with a pair of copper heater bars or shoes B B, each furnished with a heating-chamber C, of a pair of compressing-rollers D D and a horn E upon which one of said compressing-rollers and one of said heating-bars with its heating-chamber is mounted, so that the can-body may be passed over or around the same, substantially as specified.

7. The combination with a pair of copper heater bars or shoes B B, each furnished with a heating-chamber C, of a pair of compressing-rollers D D and a horn E upon which one of said compressing-rollers and one of said heating-bars with its heating-chamber is mounted, so that the can-body may be passed over or around the same, a pair of oppositely-driven pulleys, a driving-shaft, a clutch, connecting mechanism between the driving-shaft and one of said compressing-rollers, a clutch-operating lever or rock-shaft, and a movable trip adapted to be engaged by the can-body or vessel as it leaves the compressing-rollers to automatically operate the clutch to reverse the compressing - rollers, substantially as specified.

8. The combination with a pair of copper heater bars or shoes B B, each furnished with a heating-chamber C, of a pair of compressing-rollers D D and a horn E upon which one of said compressing-rollers and one of said heating-bars with its heating-chamber is mounted, so that the can-body may be passed over or around the same, a pair of oppositely-driven pulleys, a driving-shaft, a clutch, connecting mechanism between the driving-shaft and one of said compressing-rollers, a clutch-operating lever or rock-shaft, and a movable trip adapted to be engaged by the can-body or vessel as it leaves the compressing-rollers to automatically operate the clutch to reverse the compressing-rollers, said movable trip being mounted upon a slide N and a spring dog or pawl connected to the clutch-lever, substantially as specified.

9. The combination with a pair of heater bars or shoes B B, one of which is furnished with a longitudinal groove b to receive the seam, of a pair of compressing-rollers D D, one of which is furnished with a groove d to receive the seam, substantially as specified.

EDWIN NORTON.

Witnesses:
H. M. MUNDAY,
L. E. CURTIS.